March 1, 1932. C. F. BUENTE 1,847,078
SHAPING MACHINE
Filed June 5, 1928 8 Sheets-Sheet 1

Fig.1.

INVENTOR
Charles F. Buente
by Byrnes, Stebbins & Parmelee
his attorneys

March 1, 1932.  C. F. BUENTE  1,847,078
SHAPING MACHINE
Filed June 5, 1928  8 Sheets-Sheet 2

INVENTOR
Charles F. Buente
by Byrnes Stebbins & Parmelee
his attorneys

March 1, 1932. C. F. BUENTE 1,847,078
SHAPING MACHINE
Filed June 5, 1928 8 Sheets-Sheet 5

INVENTOR
Charles F. Buente
by Byrnes, Stebbins & Parmelee
his attorneys

March 1, 1932. C. F. BUENTE 1,847,078
SHAPING MACHINE
Filed June 5, 1928 8 Sheets-Sheet 6

INVENTOR
Charles F. Buente
by Byrnes, Stebbins & Parmelee
his attorneys

March 1, 1932.   C. F. BUENTE   1,847,078
SHAPING MACHINE
Filed June 5, 1928   8 Sheets-Sheet 7

INVENTOR
Charles F. Buente
by Byrnes, Stebbins & Parmelee
his attorneys

March 1, 1932.   C. F. BUENTE   1,847,078
SHAPING MACHINE
Filed June 5, 1928   8 Sheets-Sheet 8

INVENTOR
Charles F. Buente
by Byrnes, Stebbins & Parmelee
his attorneys

Patented Mar. 1, 1932

1,847,078

UNITED STATES PATENT OFFICE

CHARLES F. BUENTE, OF PITTSBURGH, PENNSYLVANIA

SHAPING MACHINE

Application filed June 5, 1928. Serial No 282,995.

My invention relates to shaping machines, and particularly to shaping machines for making re-enforcing forms or cages constituted by longitudinally extending stays and an envelope of flexible material.

I provide separately formed stays of the desired length and shape, while the material constituting the envelope is supplied in rolls of commercial size and shape. The stays are placed upon a rotatable form or mandrel and the envelope is wrapped around them as the form is rotated. However, it is to be understood that if desired the envelopes may be applied to the form before the stays are placed upon the form. In either case, the stays and envelope are secured before the finished article is taken from the form.

One example of the use of my invention is in making re-enforcing forms or cages for concrete conduit or pipe sections. While I have shown and described the invention in connection with the forming or shaping of a metallic re-enforcing cage for concrete pipe and the like, it is to be understood that certain features of the invention are adaptable to other purposes and for use with other materials, and that such uses are contemplated within the spirit of the invention and the scope of the appended claims.

I provide a machine in which a rotatable form has provision for securing the longitudinal stays and which has means for applying an envelope to the form constituted by a spiral of flexible material, which for many purposes is cold drawn wire. Cold drawn wire does not possess sufficient rigidity to prevent it from bending and otherwise losing a shape given to it unless it is re-enforced. Such re-enforcement is given it by securing it to the stays at a number of points. Where the stays are of metal, the envelope is secured by a welding operation, while the stays and envelope are supported by the rotatable form.

In order to increase the speed of operation of the machine, the means for applying the envelope to the form is made reversible so that the envelope may be started from either end of the form. Likewise the welding means is operable from either end of the form. After the stays and envelope are in position about the rotatable form, I prefer to use each stay as one of the welding electrodes by attaching a conductor to one end thereof. The welding means is then moved along the form which is held stationary and welds are made at desired intervals along one stay. Where the envelope is in the form of a continuous spiral of cold drawn wire, I prefer to make a weld wherever the stays and wire engage each other. After the welds along one stay are completed the form is rotated to bring a succeeding stay opposite the welding means, and the welding operations are repeated. Provision is made for rotating the form at different speeds during different operations.

The accompanying drawings illustrate certain present preferred embodiments of the invention, in which.

Referring to the drawings, the shaping or forming machine comprises in general a rotatable form or mandrel 4 carried by an axle 5 and driven from a motor 6 through a gear train 7; a machine 8 for supplying wrapping material 9 to the mandrel 4 and driven by a reversing gear train 10 connected with the gear train 7; and means 11, in the form of a welding machine, for securing the wrapping material 9 to stays 12 carried by the mandrel 4. The wrapping material 9 is illustrated as cold drawn wire applied to the mandrel as a spiral by the movement of the machine 8, here illustrated as a wire straightener, along a support 14.

The stays 12 are metal rods or bars resting in grooves 15 formed in supports in the form of current conducting bars 16 carried by the mandrel. By welding the envelope of wrapping material constituted by the several convolutions of the wire to the stays, I provide a hollow form or cage that is sufficiently rigid to be self-supporting and strong enough to serve as a reenforcement for a body of hardened plastic material poured or molded thereabout.

Figure 5:
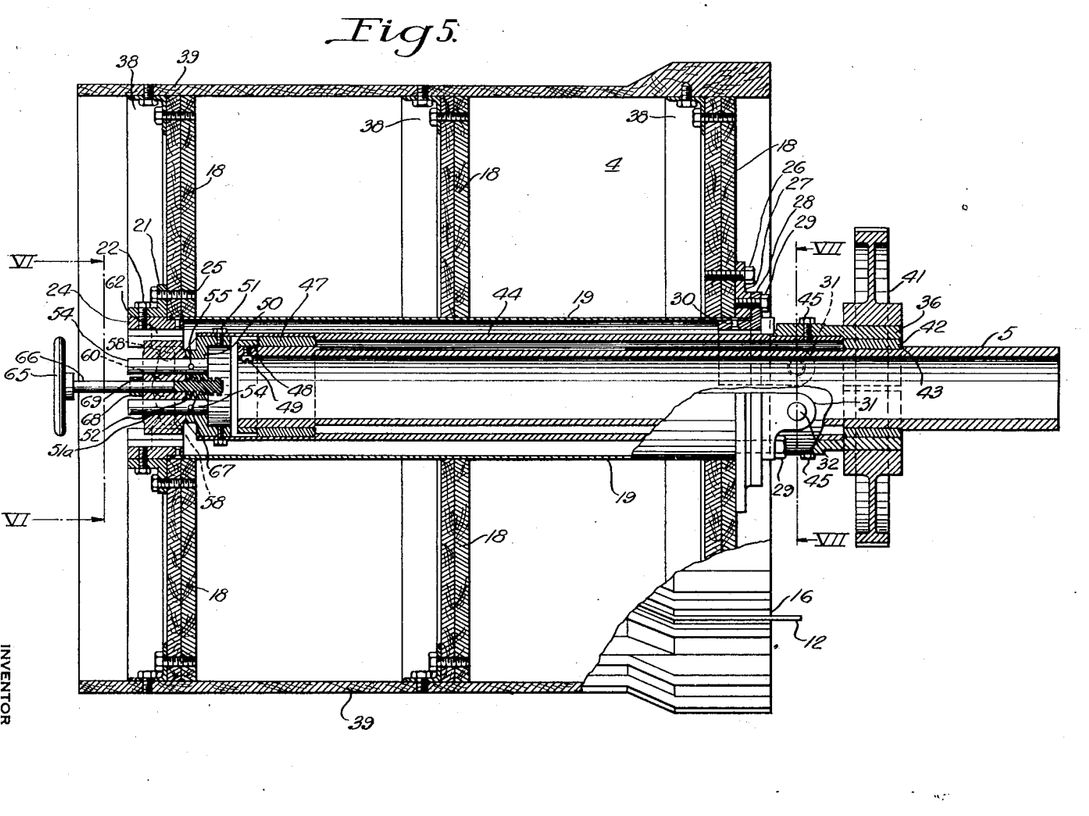
Figure 5 is a longitudinal view partially in elevation and partially in section of a form of mandrel about which a hollow article is formed or shaped.

The mandrel 4 is constituted by a plurality of webs 18 of substantially semi-circular form of electrical insulating material such as wood. The webs 18 are fastened to hubs 19 of substantially semi-cylindrical shape. The web 18 at the other end of the form, the left end as viewed in Figure 5, is secured by screws 20 to angle irons 21. The angle irons 21 are bent to conform to the contour of the hubs 19 and are secured by screws 22 to blocks 24 that extend into the hubs 19 and are secured thereto by rivets 25. Each web 18 at the inner end of the form relative to the axle 5, that is at the right of Figure 5, is secured by bolts 26 to a ring 27.

The ring 27 is seated within a hinge piece 28 to which it is secured by screws 29. The hinge piece 28 extends into the hub 19 and is secured thereto by rivets 30. The hinge piece 28 is provided with ears 31 through which pintles 32 extend. The pintles 32 are provided with threads 34 for seating in threaded openings 35 in a hinge sleeve 36 concentric with, but spaced from, the axle 5. With this construction both hubs 19 are free to turn about the pintles 32 and relative to the axle 5 when actuated, as hereinafter described.

Figures 3, 14:
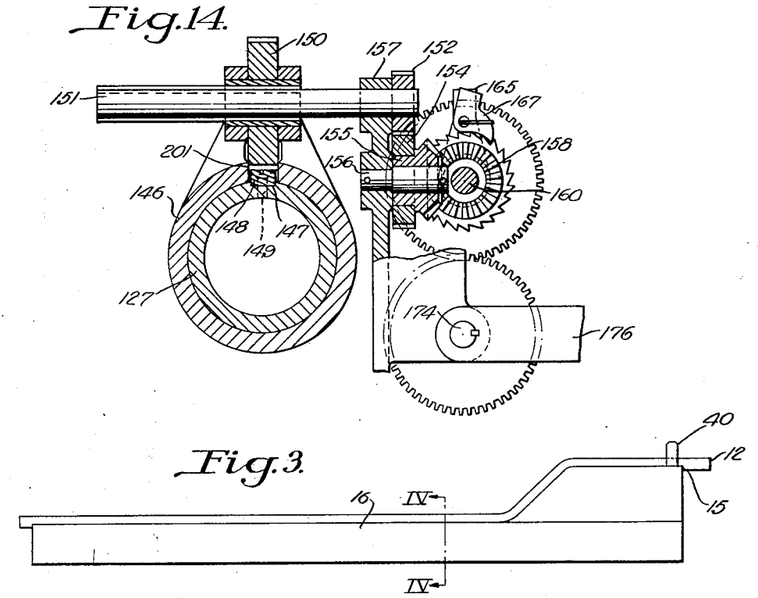
Figure 3 is a longitudinal view of a stay and supporting member.
Figure 14 is a transverse sectional view taken along the section line XIV—XIV of Figure 12.
Figure 4:
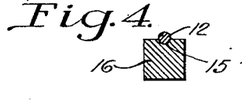
Figure 4 is a sectional view taken along the section line IV—IV of Figure 3.

The outer ends of all of the webs 18 support angle irons 38 to which are secured longitudinally extending slats 39 of non-conducting material such as wood, and the supports 16. The inner ends of the slats 29 and supports 16 are thickened in order to provide an offset portion in the finished cage, which offset portion corresponds to the bell of a section of concrete pipe. As is shown in Figure 3, the enlarged end of each current conducting support 16 is provided with upstanding ears 40 having slots therein for the reception of the stays 12. The ears 40 serve as electrical terminals during a welding operation, hereinafter more fully described. The slats 39 and the supports 16 are spaced apart in order to decrease the weight of the form.

The hinge sleeve 36 extends inwardly of the axle 5 and is secured within a gear 41 and outside the segments of a two-part bushing 42 seated in a notch 43, as illustrated in Figure 5. With this construction the ring 27 constitutes a portion of a driving spindle for the mandrel 4. A tubular sleeve or shaft 44 is slipped over the outer end of the axle 5 and is secured to the inner surface of the hinge sleeve 36 by bolts 45. The outer end of the sleeve 44 is provided with a notch 46 that engages a bushing 47 carried by the axle 5. The bushing 47 is secured to the axle 5 by a collar 48 and a set screw 49.

The outer end of the sleeve 44 is closed by a circular block 50 secured against rotation by screws 51. The block 50 is provided with centrally disposed screw threads 51a, and openings 52 in which studs 54 are secured by pins 55.

Figures 6, 7, 8:
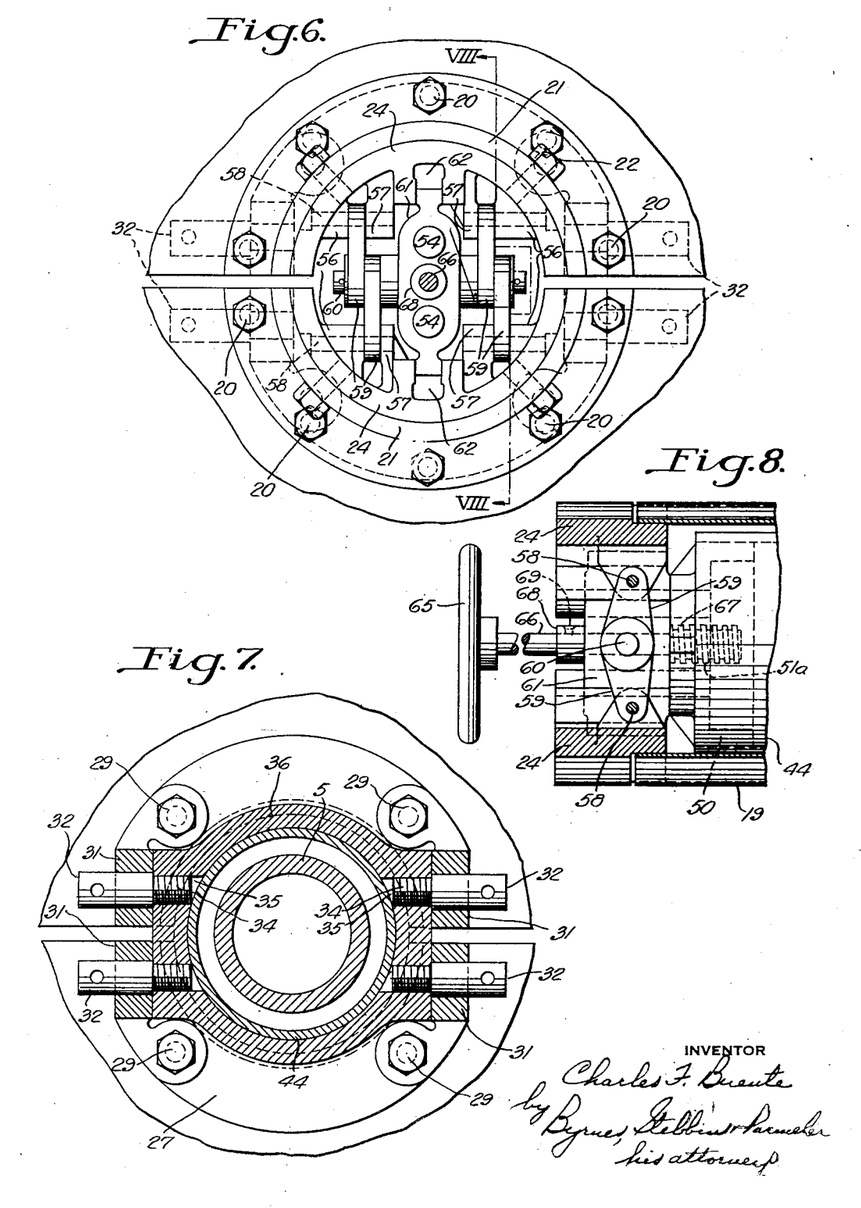
Figure 6 is an end view of a portion of the mandrel taken along the section line VI—VI of Figure 5.
Figure 7 is a similar view taken at the opposite end of the mandrel and substantially along the section line VII—VII of Figure 5.
Figure 8 is a longitudinal sectional view of a portion of the mandrel taken along the section line VIII—VIII of Figure 6.

Referring to Figures 5, 6 and 8, the inner surfaces of the blocks 24 are provided with pairs of bosses 56 and 57 having aligned openings therein for the reception of pintles 58 and between which links 59 are disposed in overlying relation. A shaft 60 extends through openings in the aligned links 59 and through a cross-head 61. The cross-head 61 is movable longitudinally of the mandrel in guideways 62 formed in the blocks 24 and along the studs 54, by the manipulation of a hand wheel 65 mounted on a shaft 66. The shaft 66 has a threaded portion 67 coperating with the threaded portion 51a of the block 50.

The cross head 61 is held against relative movement along the shaft 66 by the threads 67 and a collar 68 secured by a screw 69 to the shaft 66. With the foregoing construction the spindle for the mandrel 4 is constituted by the hinge sleeve 36, the sleeve 44, the block 50, the cross-head 61 and the blocks 24. For collapsing the mandrel the hand wheel 65 is turned to move the cross-head away from the block 50, thereby moving the shaft 60 outwardly relative to the pintles 58. As the links 59 are non-extensible, the outward movement of the cross-head and link 59 causes the blocks 24 to be drawn inwardly toward the shaft 66, with the result that the hubs 19 are turned about the pintles 32.

The turning movement of the hubs 19 moves the slats 39 and supports 16 in parallelism therewith to decrease the over-all diameter of the outer end of the mandrel. After a cage is formed on the mandrel, the collapsing movement of the mandrel permits of the cage being readily withdrawn therefrom. For again expanding the mandrel, the hand wheel 65 is turned to move the cross head 61 into engagement with the block 50, thereby moving the blocks 24 outwardly for bringing the supports 16 and slats 39 into substantial parallelism with the axle 5.

As shown in Figures 1, 2, 9 and 10, the axle 5 is imbedded in the frame 70 of the machine. The frame 70 also carries the gear train 7 heretofore referred to. In the gear train 7 the motor 6 is connected to a sprocket wheel 71 by a sprocket chain 72. The sprocket wheel 71 is mounted on a shaft 74 that extends through a clutch mechanism 75 for driving a gear 76 or a gear 77 mounted on the shaft 74.

The gear 77 meshes with a gear 78, keyed to a shaft 79. The gear 76 meshes with a gear 80, also keyed to the shaft 79. The ratio of the gears 77 and 78 as compared with the ratio of the gears 76 and 80 is such that the combination of the gears 77 and 78 rotate the shaft at a higher rate of speed than does the combination of the gears 76 and 80. The shaft 79 is provided with a gear 81 meshing with a gear 82 carried by a shaft 84. The shaft 84 extends through the frame 70 and is provided at the end opposite the gear 82 with a gear 85 meshing with the gear 41. The hub of gear 41 is provided with a sprocket wheel 86 that drives a sprocket chain 87 for actuating the gear train 10. With the foregoing construction the gear 41, and therefore the mandrel 4, may be driven at different rates of speed during different stages of the forming or shaping operations for reasons hereinafter more fully explained.

Figure 1:
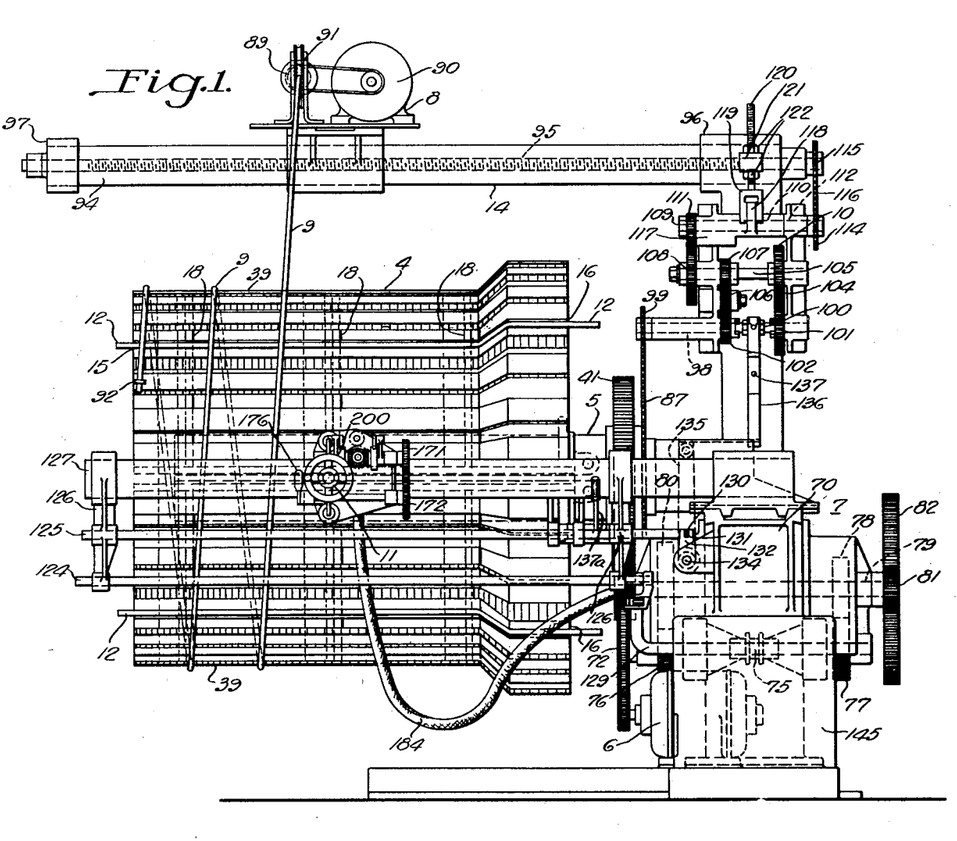
Figure 1 is an elevational view of a shaping or forming machine embodying my invention.

The machine 8 for supplying wrapping material 9, in the form of a wire straightener, comprises a stationary reel 88 from which the wire is unrolled and passes through a rotating wire straightener 89. The wire straightener 89 is driven by a motor 90. From the wire straightener 89, the wire passes through guide rollers 91 from which it is led to the mandrel. A convenient method of securing an end of the wire of the mandrel is by driving a staple 92 into one of the slats 39.

The machine is mounted on the support 14 constituted by a pair of rods 94 extending outwardly from the frame 70 of the machine. A screw 95 extends between a bearing 96 and a cross-head 97 carried by the rods 94. The screw 95 passes through the frame of the machine 8 and, accordingly, as the screw is rotated in either direction the machine 8 moves along the rods 94 in substantial parallelism with the surface of the mandrel 4.

Figure 9:
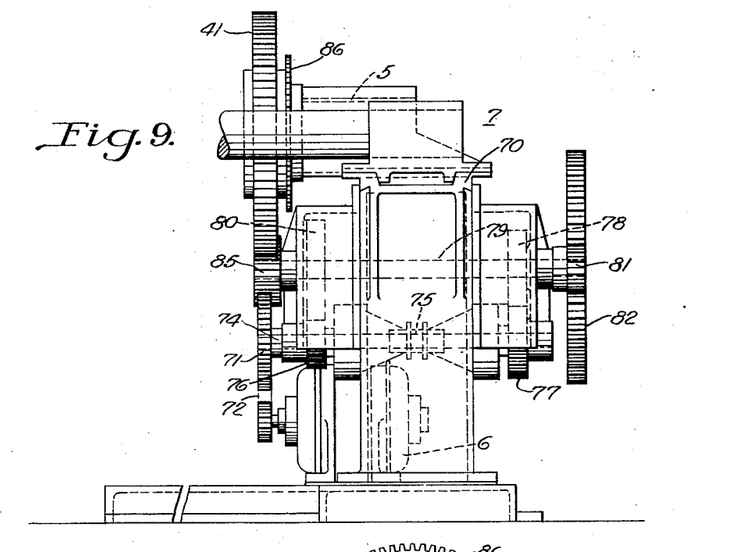
Figure 9 is a longitudinal elevational view of the driving mechanism for the machine.
Figure 10:
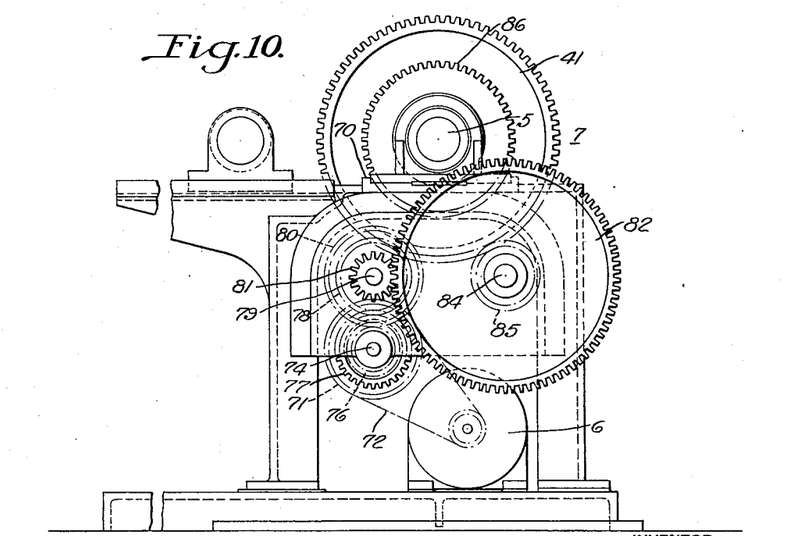
Figure 10 is an end elevational view of the driving mechanism.
Figure 11:
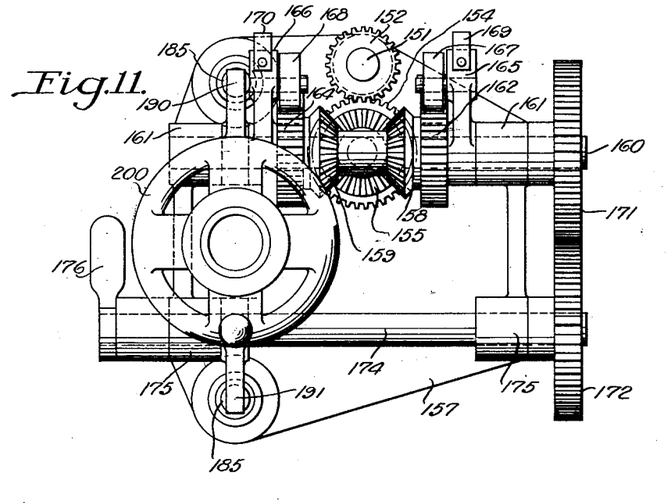
Figure 11 is a longitudinal elevational view of a machine for welding a stay and the envelope.
Figure 12:
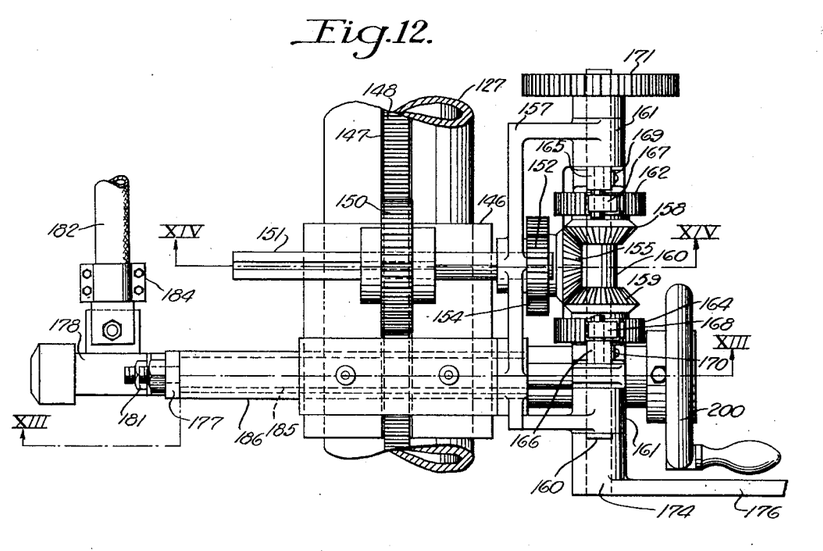
Figure 12 is a plan view of the machine shown in Figure 11.

It is to be understood that the pitch of the screw 95 may be varied in accordance with the desired spacing of the convolutions of the wire constituting the wrapping envelope disposed about the mandrel 4. The gear train 10 for driving the screw 95 comprises a shaft 98 carrying a sprocket wheel 99 meshing with the sprocket chain 87. A clutch 100 is movable along the shaft 98 for connecting either a gear 101 or a gear 102 thereto. The gear 101 meshes with a gear 104 keyed to a shaft 105 for driving the latter in one direction. The gear 102 meshes with a gear 106 interposed between it and a gear 107 also keyed to the shaft 105.

As only one of the gears 101 or 102 is driven from the shaft 98 through the clutch 100 at any time, it follows that by connecting gear 101 thereto the shaft 105 is driven in one direction. By connecting the gear 102 to the shaft 98, the shaft 105 is driven in the reverse direction. The ratios between the gears 101 and 105 and between the gears 102, 106 and 107 is preferably made a 1 to 1 ratio in order to insure that the shaft 105 is always rotated at the same speed. The shaft 105 is provided with a gear 108 meshing with a gear 109 carried by a movable shaft 110.

The gear 109 meshes with a gear 111 carried by a shaft 112. Shaft 112 carries a sprocket wheel 114 that drives the screw 95 through a sprocket wheel 115 mounted on the latter, and a sprocket chain 116. The shaft 110 is supported by a bell crank 117 movable about the shaft 112. An arm 118 of the bell crank 117 is pivotally connected with a yoke 119 carried by a threaded stem 120 that extends through a lug 121 mounted on the frame 70 of the machine. By adjusting lock nuts 122 longitudinally of the stem 120, the position of the gear 109 relative to the gear 108 is varied. Accordingly, the diameter of the gear 109 may be varied for changing the gear ratio of the gear train and thereby change the speed of rotation of the screw 95. The screw 95 may be disconnected at gear 109.

For controlling the clutches 75 and 100, longitudinally movable rods 124 and 125, respectively, are provided. Rods 124 and 125 extend horizontally substantially parallel to the surface of the mandrel 4. I prefer to mount the rods 124 and 125 beneath the welding machine 11, in brackets 126 suspended from a supporting rod 127 for the welding machine. The rod 124, at its inner end, is provided with a yoke 128 connected to the end of an arm 129 extending into the clutch 75 for moving the latter longitudinally of the shaft 74 for selectively engaging the gear 76 or 77.

The rod 125 terminates in a pin 130 seated in a notch 131 of a lever 132 carried by a shaft 134 extending transversely of the frame 70. The other end of the shaft 134 is provided with a lever arm 135 that extends upwardly and rearwardly for engaging the tail of a clutch lever 136 having movement about a pivot 137. The other end of the clutch lever 136 moves the clutch 100 longitudinally of the shaft 98.

In forming a re-enforcing cage, an end of the wire 9 is secured by the staple 92 to either end of the mandrel in accordance with the position of the machine 8. A single stay 12 is placed in the nearest support in a counter direction of rotation to the staple 92. The rod 124 is moved to cause the clutch 75 to secure the gear 76 to the shaft 74, whereupon the mandrel 4 turns as wire is drawn from the spool 88 through the wire straightener 89 and rollers 91. Simultaneously the machine 8 moves along the supporting rods 94 and screw 95 in accordance with the position of the clutch 100 as determined by the position of the rod 125.

Slow movement of the mandrel is continued until a second support 16 comes into position to be engaged by the first convolution of the wire 9. A stay 12 is then placed in the support and held therein until the wire 9 passes over the stay and binds it in place. This operation is continued until the stays have been secured in all of the supports 16. Thereafter the clutch 75 is moved to drive gear 77, with a result that the speed of rotation of the mandrel 4 is increased. After the desired number of convolutions of the wrapping envelopes have been made, the mandrel 4 is stopped and the wire severed. The free end of the wire may be secured by a temporary fastening device such as a staple if desired. The cage is then ready for securing the wire to the stays, which, in the present embodiment of the invention, is done by welding.

Figure 15:
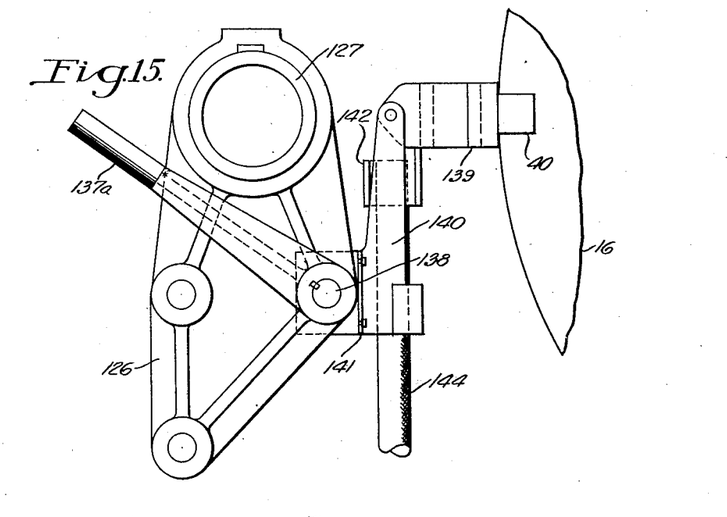
Figure 15 is an end view of a contact making device for energizing the stays and supports.
Figure 16:
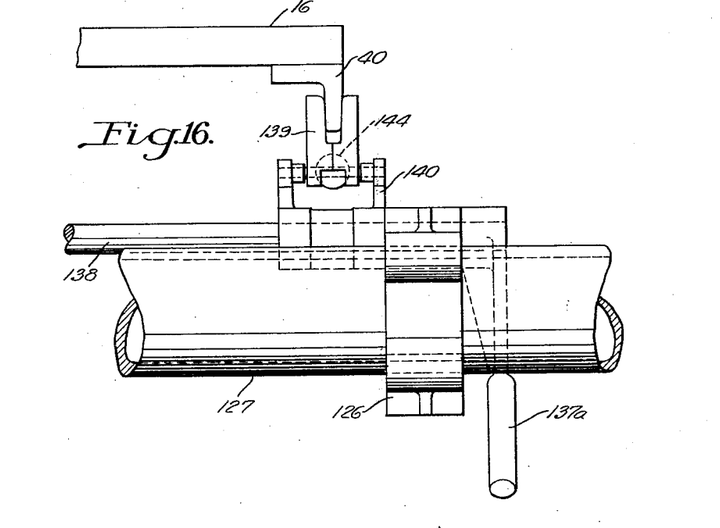
Figure 16 is a plan view thereof.

The welding machine 11 is then placed at either end of the supporting rod 127 and moved longitudinally of the rod for making the desired number of welds along the stay 12 opposite the welding machine. An electrical connection to the end of the stay 12 opposite the welding machine 11 is made by moving a handle 137a carried on a rod 138 suspended in the brackets 126 for moving an electrical terminal 139 into engagement with the terminal 40 on the support 16. The terminal 139 is of V shape to enclose the terminal 40. The terminal 139 is carried on an arm 140 rotatable with the shaft 138, but electrically insulated therefrom by a layer of insulating material 141. The terminal 139 is provided with a ferrule 142 for engaging an electrical conductor 144. The electrical conductor 144 is connected to a transformer 145.

After the circuit to the support 16 and stay 12 is completed between the terminals 40 and 139, the machine is ready for the operation of the welding machine 11. Referring to Figures 11 to 14, inclusive, the welding machine 11 comprises a carriage 146 through which the support 127 extends. For moving the carriage 146 longitudinally of the support 127, the latter is provided with a longitudinally extending notch 147 in the upper surface thereof, to which a rack 148 is secured by screws 149. Movement is imparted to the carriage 146 by a pinion 150. The pinion 150 is mounted on a splined shaft 151 carried by the carriage 146. Movement of the carriage 146 in either direction along the support 127 is had by rotating the pinion 150 in opposite directions.

For imparting turning movement to the shaft 151 and pinion 150, the shaft 151 is connected through a gear 152 meshing with a gear 154 mounted on the shank of a bevelled gear 155. The bevelled gear 155 is supported by a stud shaft 156, carried by a plate 157 movable relative to the carriage 146. A pair of bevelled gears 158 and 159 are loosely carried by a shaft 160 supported in bearings 161 carried by the plate 157. The gears 158 and 159 are rigidly connected to a ratchet wheel 162 and 164, respectively. The ratchet wheels 162 and 164 are concentric with the shaft 160.

Crank arms 165 and 166 are keyed to the shaft 160 and support pawls 167 and 168 cooperating with the ratchet wheels 162 and 164, respectively. The pawls are mounted to ride over the teeth of the ratchet wheels when the shaft 160 is given a counter-clockwise rotation as viewed in Figures 13 and 14. With a clockwise movement, both of the pawls tend to engage their associated ratchet wheels for moving the bevelled gear 155.

Figure 13:
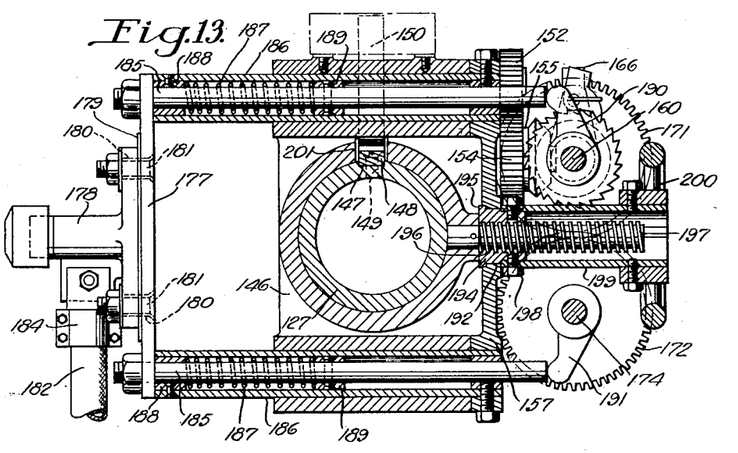
Figure 13 is a transverse sectional view thereof taken along the section line XIII—XIII of Figure 12.

It is therefore obvious that if both of the pawls are in position when it is attempted to rotate the shaft 160 in a clockwise direction, the entire system will be locked by the tendency of the gears 158 and 159 to rotate the gear 155 in opposite directions. In order to rotate the gear 155 in either direction, it is therefore necessary to raise one of the pawls 167 or 168 out of engagement with its associated ratchet wheel. For this purpose pawl stops 169 and 170 are mounted on the crank arms 165 and 166, respectively.

Upon the rotation of either of the pawl stops 169 or 170 against the upper end of the pawl 167 or 168, respectively, the lower end of the pawl is raised out of engagement with its associate ratchet wheel. Accordingly, the pawl remaining in engagement with an associated ratchet wheel controls the direction of movement of the bevelled gear 155, thereby controlling the direction of movement of the carriage 146 along the support 127, upon rotation of the shaft 160 in a clockwise direction as viewed in Figures 13 and 14.

For rotating the shaft 160, it is provided with a gear wheel 171 meshing with a gear 172 carried by a shaft 174 supported in bearings 175 on the plate 157. The shaft 174 extends substantially parallel to the shaft 160 but is preferably disposed below the latter. A hand lever 176 is keyed to the shaft 174 for actuating the shaft 174 and the gear train previously described. With the foregoing construction the operator, when desirous of moving the machine 11 along the support 127, locks one of the pawls 167 or 168 out of the service and proceeds to raise and lower the lever 176. Upon each up stroke of the lever 176 the carriage is moved longitudinally of the support 127.

During each down stroke of the lever 176, a tool support 177 is advanced for bringing a tool 178, herein shown and described as a welding electrode, into engagement with the form or cage on the surface of the mandrel 4. The welding electrode 178 is insulated from the tool support 177 by a sheet of insulating material 179 and insulating sleeves 180 disposed about securing bolts 181. An electrical conductor 182 is secured to the welding electrode 178 by a terminal clip 184. The tool support 177 is carried by rods 185 extending outwardly through sleeves 186 slidably seated in the carriage 146 and fastened to the plate 157.

Springs 187 are placed between blocks 188, closing the outer ends of the sleeves 186 and collars 189 carried by the rods 185. The springs urge the rods into a retracted position, or to the right, as viewed in Figure 13. for urging the electrode 178 away from the surface of the mandrel 4. For moving the rods outwardly relative to the carriage 146, I provide crank-arms 190 and 191 on the shafts 160 and 174, respectively. The ends of the cranks engage the ends of the rods. As the shafts 160 and 174 turn in opposite directions during any movement of the handle 176, the crank arms extend in opposite directions from the centers of the shafts in order that as the handle 176 is pulled downwardly, the crank arms 190 and 191 turn outwardly and push the rods 185 longitudinally of the sleeves 186 for bringing the electrode 178 into engagement with the stays and wires carried by the mandrel 4.

With the foregoing structure, downward movement of the handle 176 brings the electrode 178 into welding position and the return upward movement of the handle permits the return of the electrode under the influence of the springs 187, and the movement of the carriage along the support 127 for positioning the carriage for a subsequent welding operation.

As the diameter of the mandrel 4 may vary, especially when it is desired to provide an enlarged portion of a concrete cage corresponding to the bell of a finished section of concrete pipe, provision is made for changing the welding positions of the electrode 178 relative to the support 127 in accordance with the changes in the configuration of the mandrel 4. For this reason the plate 157 is provided with an opening 192 in which a block 194 is seated. The block 194 is cylindrical in shape and is provided with a flange 195 for preventing the outward movements of the block through the opening 192.

The block 194 is provided with threads 196 that cooperate with threads carried by a stem 197 projecting outwardly from the carriage 146. The outer end of the block 194 is secured by screws 198 to a tubular handle 199, to the outer end of which a hand-wheel 200 is secured. Upon rotation of the hand-wheel 200 to move the block 194 outwardly along the stem 197, the plate 157 is moved away from the carriage 146. At the same time, the sleeves 186 are moved through their seats in the carriage 146. However, the movement of the plate 157 does not interfere with the operation of the lever 176 for moving the carriage 156 or the electrode 178. As the movement of the plate 157 causes the splined shaft 151 to move through the gear 150, the latter is held in position by the edges of a groove 201 in the carriage 146.

Figures 2, 17:
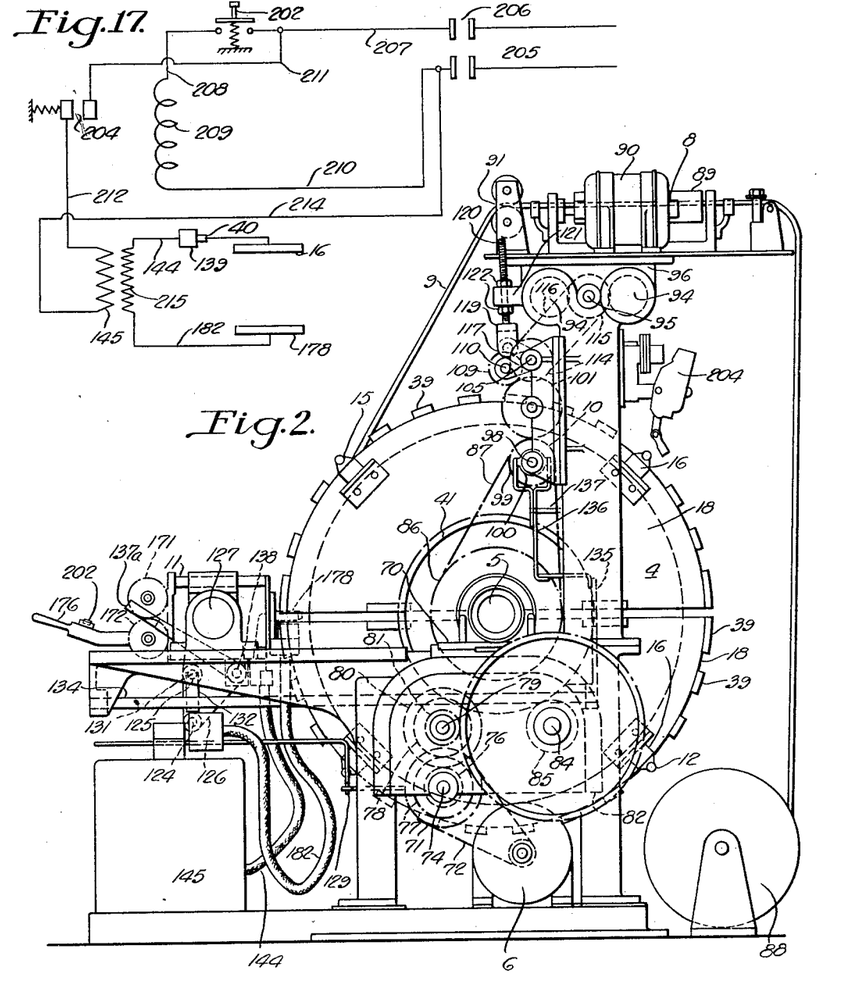
Figure 2 is an end view thereof.
Figure 17 is a diagrammatic view of circuits and apparatus showing the electrical connections for the machine.

For completing the welding circuit at the discretion of the operator, the handle 176 carries a push-button switch 202 that controls a contactor 204 carried on the frame 70 of the machine. The circuit connections for controlling the welding operation are illustrated in Fig. 17. A source of electromotive force 205 is controlled by a circuit breaker 206. A conductor 207 extends from one of the terminals of the circuit breaker 206 to one terminal of the push button switch 202.

From the other terminal of the switch a conductor 208 extends to the winding 209 of the contactor 204. The other terminal of the winding 209 is connected by a conductor 210 to the other terminal of the circuit breaker 206. Accordingly, upon the closure of the circuit breaker 206 and the closing of the push button switch 202, the contactor 204 is closed. The closing of the contactor 204 completes a circuit from one terminal of the circuit breaker 206 through the conductor 207, a conductor 211, the contact members of the contactor 204, a conductor 212 and through the primary winding of the transformer 145 and a conductor 214 to the other terminal of the circuit breaker 206. The closing of the contactor 204 energizes the transformer 145 and, as the terminals 40 and 139 are in engagement, the welding circuit is completed from the support 16 through the terminals 40 and 199, the conductor 144, and the secondary winding 215 of the transformer 145 and through a conductor 182 to the electrode 178.

With the foregoing circuit connections, the welding operation continues so long as the operator keeps the push button switch 202 closed. Upon release of the switch 202, the contactor 204 opens for deenergizing the transformer 145, thereby terminating the welding operation. Thereafter the lever 176 is raised for moving the welding machine 11 to the next position for a welding operation. After all the welds along any stay have been completed, the terminals 139 and 40 are separated and the mandrel 4 is rotated to bring the next support 16 opposite the electrode 178, when the welding operation is repeated.

As the welding machine is movable along its support 127 in both directions, the welding operation is begun at whichever end of the mandrel the welding machine is located, by merely locking or unlocking the pawl 167 or 168, as may be required. When all of the stays 12 have been welded to the several convolutions of the wire envelope, the mandrel 4 is collapsed by the manipulation of the hand-wheel 65, and the finished form or cage is withdrawn. The mandrel 4 is again expanded, the free end of the wire 9 is attached to one of the salts 39 and the winding operation is repeated. The winding operation is followed by the welding operation previously described.

While I have illustrated and described certain preferred embodiments of my invention, it is to be understood that various changes may be made in the invention without departing from the scope of the appended claims.

I claim:

1. A shaping machine comprising a form having a plurality of sections, means for pivotally mounting the sections at one end, and means for moving the sections about their pivotal mountings, said means comprising an actuating screw, a cross-head movable therewith, and links for connecting the cross-head to the several sections.

2. A shaping machine comprising a form of irregular dimensions, a support extending substantially parallel to an axis of the form, and a machine carried by the support for working on material disposed at the surface of the form, said machine having means for adjusting its position on the support in a direction substantially normal to the axis of the support in accordance with the variations in the dimensions of the frame.

3. A shaping machine comprising a support for material being worked upon, a tool, and means for actuating the tool into and out of engagement with the material on the support and for moving the support longitudinally of the material in a single operating cycle.

4. A shaping machine comprising a support for material being worked upon, a tool, and means comprising a lever for actuating the tool into and out of engagement with the material on the support and for moving the support longitudinally of the material in a single operating cycle of the lever.

5. A shaping machine comprising means for supporting material being worked upon, and a machine movable relative to the material being worked upon, said machine comprising a tool, a lever, and means connecting the lever and tool, whereby upon movement of the lever in one direction the tool is moved into engagement with the material being worked upon, and upon another movement of the lever the machine is moved relative to the material being worked upon.

6. A shaping machine comprising means for supporting material being worked upon, and a machine movable relative to the material being worked upon, said machine comprising a tool, a lever, and means connecting the lever and tool, whereby upon movement of the lever in one direction the tool is moved into engagement with the material being worked upon, and upon a return movement of the lever the machine is moved relative to the material being worked upon.

7. A shaping machine comprising means for supporting material being worked upon, and a machine movable relatively to the material being worked upon and comprising a tool, actuating means, and means for connecting the actuating means and tool for moving the tool upon one movement of the actuating means and for controlling the direction of movement of the machine upon another movement of the actuating means.

8. A shaping machine comprising means for supporting material being worked upon, and a machine movable relatively to the material being worked upon and comprising a tool, actuating means, and means for connecting the actuating means and tool for moving the tool upon one movement of the actuating means and for controlling the direction of movement of the machine upon another movement of the actuating means, said connecting means comprising pairs of pawls and ratchet wheels.

9. A shaping machine comprising means for supporting material being worked upon, and a machine movable relatively to the material being worked upon and comprising a tool, actuating means, and means for connecting the actuating means and tool for moving the tool upon one movement of the actuating means and for controlling the direction of movement of the machine upon another movement of the actuating means, said connecting means comprising pairs of pawls and ratchet wheels movable about a common shaft.

10. A shaping machine comprising means for supporting material being worked upon, and a machine movable relatively to the material being worked upon and comprising a tool, actuating means, and means for connecting the actuating means and tool for moving the tool upon one movement of the actuating means and for controlling the direction of movement of the machine upon another movement of the actuating means, said connecting means comprising pairs of pawls and ratchet wheels movable about a common shaft, and means for selectively rendering either pair of pawls and ratchet wheels ineffective.

11. A machine comprising a movable tool support, longitudinally movable carrying rods therefor, a plurality of interconnected shafts, actuating means therefor, and cranks carried by the shafts for engaging the ends of the carrying rods for actuating them.

12. A machine comprising a tool support, resiliently mounted longitudinally movable carrying rods therefor, a plurality of shafts, means for actuating the shafts, cranks carried by the shafts for engaging the ends of the rods for moving the rods longitudinally upon movement of the shafts in one direction, and means controlled by the shafts for moving the machine upon a movement of the shafts in another direction.

13. A shaping machine comprising a rotatable mandrel having a plurality of work carriers mounted thereon, electrical terminals carried by the work carriers, an electrical machine movable axially of the mandrel, and means for connecting the terminal on the work carriers to a source of electromotive force when the work carriers are in position for cooperation with the electrical machine.

14. A shaping machine comprising a rotatable mandrel having a plurality of work carriers mounted thereon, electrical terminals carried by the work carriers, an electrical machine movable axially of the mandrel, and means for connecting the terminal on the work carriers to a source of electromotive force when the work carriers are in position for cooperation with the electrical machine, said connecting means comprising a terminal and an actuating lever therefor.

15. A shaping machine comprising a movable form, a plurality of supports for longitudinally extending metallic elements carried by the form, means for supplying wrapping material to the form, and means for completing electrical circuits through the supports when the supports are brought opposite an electrical machine.

In testimony whereof I have hereunto set my hand.

CHARLES F. BUENTE.